United States Patent
Sugimoto

(10) Patent No.: US 6,338,532 B1
(45) Date of Patent: Jan. 15, 2002

(54) DUAL LOCK SEAT RECLINING MECHANISM

(75) Inventor: Kunihisa Sugimoto, Shizuoka (JP)

(73) Assignee: Fuji Kiko Co., Ltd., Kosai (JP)

(*) Notice: Subject to any disclaimer, the term of this patent is extended or adjusted under 35 U.S.C. 154(b) by 0 days.

(21) Appl. No.: 09/560,903

(22) Filed: Apr. 28, 2000

(30) Foreign Application Priority Data

May 17, 1999 (JP) .......................................... 11-135457

(51) Int. Cl.[7] .................................................. B60N 2/02
(52) U.S. Cl. .................................................... 297/367
(58) Field of Search ............................... 297/367, 366

(56) References Cited

U.S. PATENT DOCUMENTS 5,340,196 A * 8/1994 Ikegaya et al.
5,899,533 A * 5/1999 Tatematsu et al.
6,003,945 A * 12/1999 Kojima
6,095,608 A * 8/2000 Ganot et al.

* cited by examiner

*Primary Examiner*—Milton Nelson, Jr.
(74) *Attorney, Agent, or Firm*—Foley & Lardner

(57) ABSTRACT

A dual lock seat reclining mechanism includes left and right devices and a connection member connecting the left and right devices. Each device includes a base member to be fixed to a seat cushion, a swing tooth plate adapted to be fixed to a seat back and swingably mounted on the base plate through a center shaft, and a look tooth member having an external toothed portion for engaging with an internally toothed portion of the swing tooth plate. An operation member or lever is swingable between the base member and the swing tooth member, for moving the look tooth member toward and away from the internal toothed portion of the swing tooth plate for locking and unlocking. The operation member has a pin slidably received in an elongate arc hole of the base plate. A link has an outer bent portion engaged with the pin in the elongate hole, and an inner portion connected with one end of the connection member for transmission of rotation.

9 Claims, 6 Drawing Sheets

DUAL LOCK SEAT RECLINING MECHANISM

BACKGROUND OF THE INVENTION

The present invention relates to a dual lock seat reclining mechanism, in particular to the left and right interlocking structure in a mechanism in which a symmetric pair of left and right seat reclining devices each with an internally toothed portion are placed on the left and right sides of a seat cushion of a vehicle such as a car.

Many conventional vehicle seat reclining mechanisms are of a dual lock type having a left and right pair of seat reclining devices each with a so-called externally toothed portion. The left and right devices on the left and right sides of the seat cushion are connected by a rotatable connection pipe so that operation of one device causes operation of the other device. The left and right ends of the rotatable connection pipe are operatively connected with the left and right devices, respectively, by left and right links. Each of the left and right devices has a lock mechanism of an external tooth type or an internal tooth type.

SUMMARY OF THE INVENTION

It is an object of the invention to provide a dual lock seat reclining mechanism having a more-reliable and less-obstructive linkage between left and right locks.

According to the present invention, a dual lock seat reclining mechanism comprises:

a rotatable connection member extending from a left end to a right end; and a left mechanism connected with the left end of the connection member and a right mechanism connected with the right end of the connection member.

Each of the left and right mechanisms comprises;

a base plate adapted to be fixed to a seat cushion, the base plate comprising an elongate arc hole;

a swing tooth plate adapted to be secured to a seat back, the tooth plate having a recess formed with an internally toothed portion;

a center shaft supporting the tooth plate rotatably relative to the base plate;

a lock tooth member having an externally toothed portion for engaging with the internally toothed portion of the swing tooth plate;

an operation member for moving the lock tooth member in the guide portion of the base plate toward and away from the internally toothed portion of the swing tooth plate for engagement and disengagement between the externally toothed portion and the internally toothed portion, the operation member comprising a pin; and a link comprising an inner portion connected with the connection member, and an outer bent portion received in the elongate arc hole of the base plate and engaged with the pin.

DETAILED DESCRIPTION OF THE INVENTION

Figure 1:
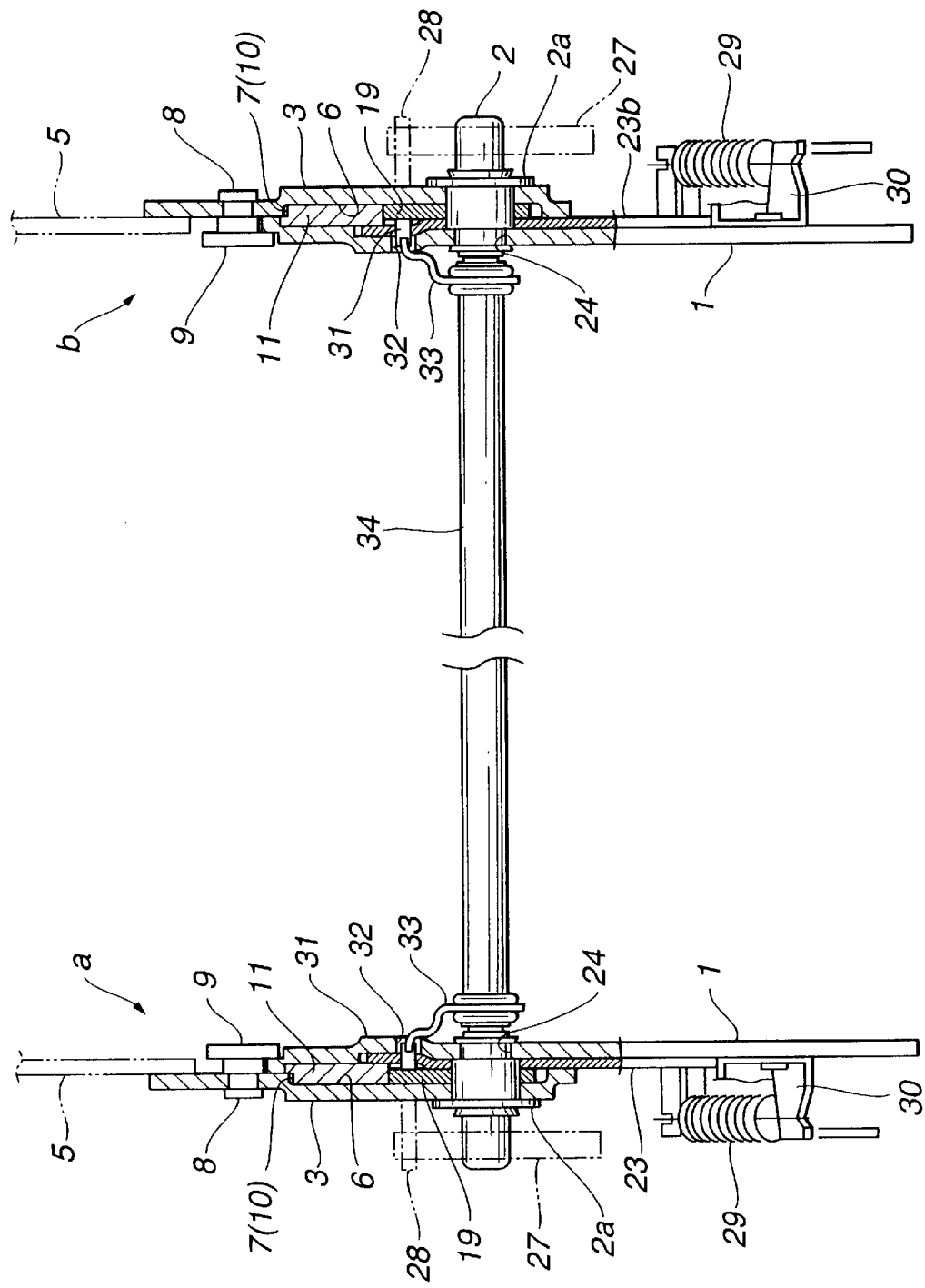
FIG. 1 is a longitudinal sectional view showing a back side of a seat reclining mechanism according to one embodiment of the present invention.
Figure 2:
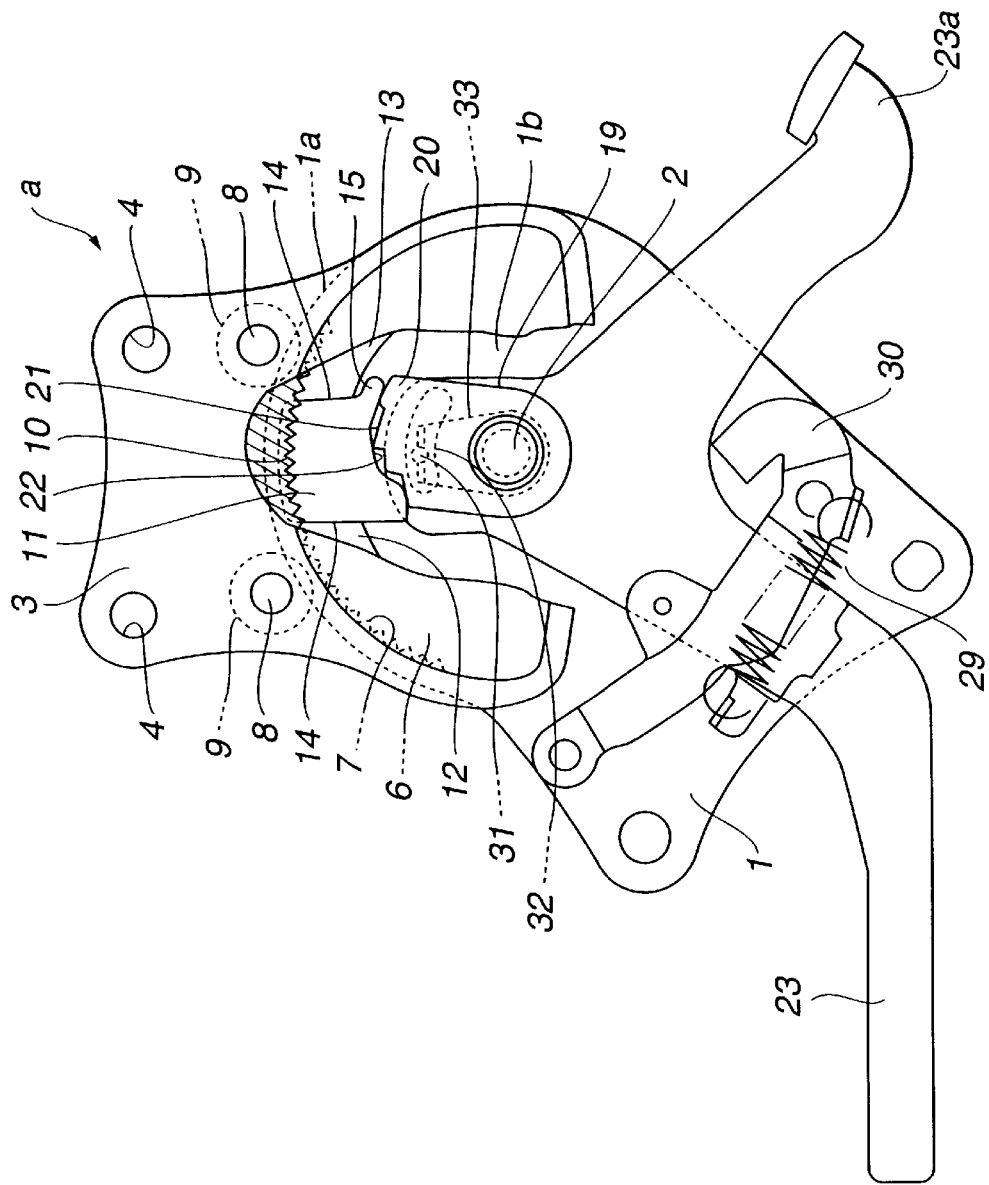
FIG. 2 is a front view of an internal tooth type outer side seat reclining device of the seat reclining mechanism of FIG. 1.

FIG. 1 shows a dual lock seat reclining mechanism according to one embodiment of the present of the present invention. This dual lock seat reclining mechanism includes left and right internal tooth or gear type seat reclining devices a and b arranged substantially in a manner of bilateral symmetry. In FIG. 1, the device a is on the outer (or outboard) side and the device b is on the inner (or inboard) side. Each of the outer and inner devices a and b includes a base plate 1, a center shaft 2 and a swing tooth plate 3. The base plate 1 is adapted to be fixed on a vehicle body through a seat slide device (not shown) or the like. The tooth plate 3 is rotatably supported through the center shaft 2 on the base plate 1. The tooth plate 3 is connected to an arm 5 through connection holes 4 (as shown in FIG. 2), and the arm 5 is secured to the side of the seat back. It is also possible to secure the tooth plate 3 directly to the side of the seat back without the arm 5. The base plate 1 to be fixed to the seat cushion has an upper portion including a circular arc portion 1a extending, around the center shaft 2, in the form of an arc of a circle having a predetermined radius.

Figure 3:
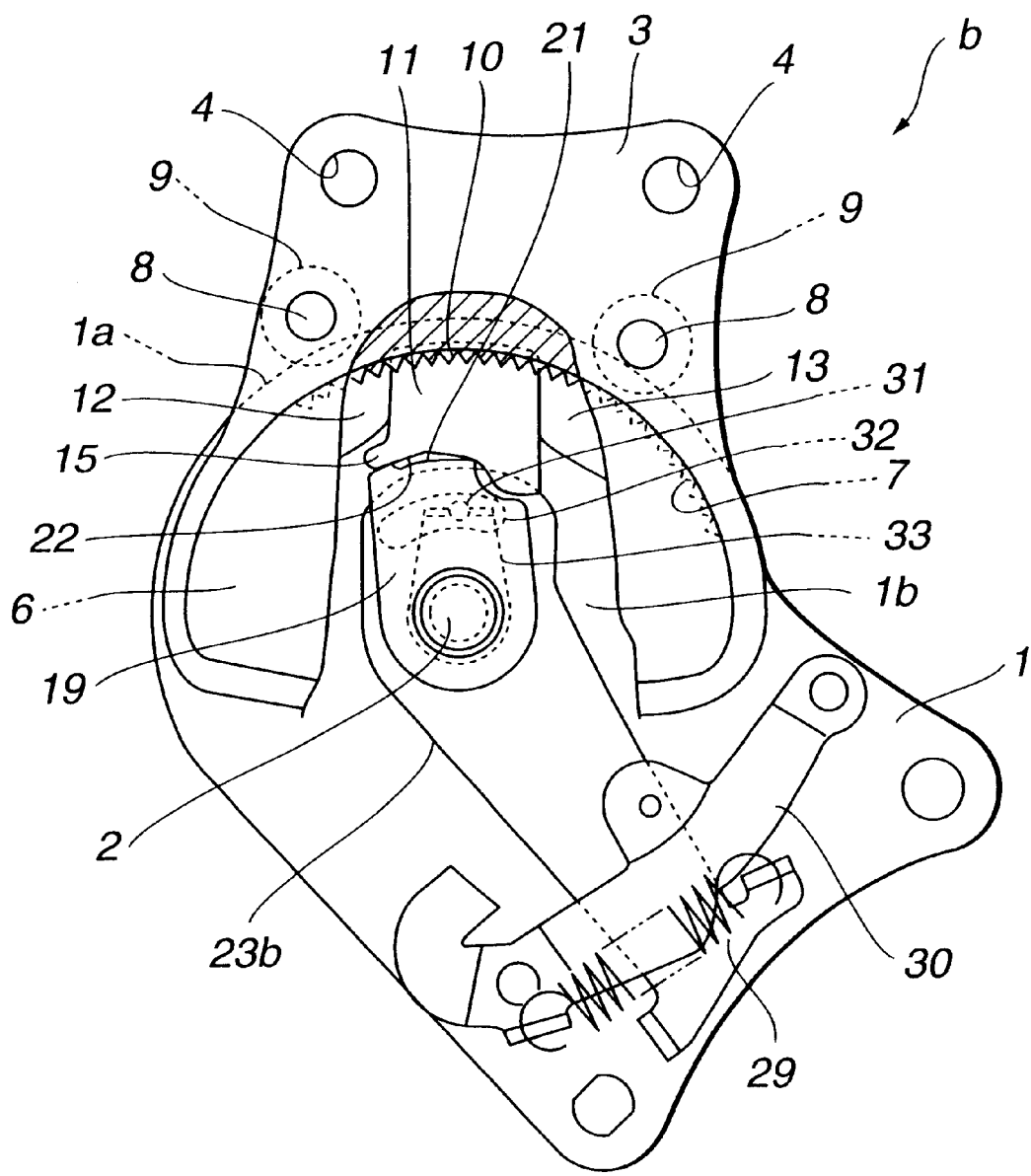
FIG. 3 is a front view of an internal tooth type inner side seat reclining device of the seat reclining mechanism of FIG. 1.

On the side facing the base plate 1, the tooth plate 3 has a sectorial recess 6 formed by embossing or other processing. The sectorial recess 6 is shaped like a sector of a circle of a predetermined radius around the center shaft 2. The recess 6 has an inside circumferential surface formed with an internally toothed portion 7 by press forming. As shown in FIG. 2 and FIG. 3, in the upper end portion of the tooth plate 8, the tooth plate 3 has pin holes each receiving a pin 8 having a flange 9 on the inner side. The flange portion 9 of each pin 8 slides on the circular arc portion 1a of the base plate 1, and thereby functions as means for pressing the circular arc portion 1a of the base plate 1 against the tooth plate 3 to prevent removal. The circular arc portion 1a is kept between the tooth plate 3 and the flanges 9 of the pins 8.

A lock tooth member 11 has an externally toothed portion 10 formed in the upper edge. The externally toothed portion 10 of the tooth member 11 is designed to engage with the internally toothed portion 7 of the tooth plate 3. The tooth member 11 is slidably received in a recess 1b formed in the base plate 1. The tooth member 11 is sandwiched between the base plate 1 and the tooth plate 3, and received in the sectorial recess 6 of the tooth plate 3. The base plate 1 has guide portions 12 and 13 having guide surfaces for slidably guiding the tooth plate 11 radially. The guide portions 12 and 13 may be in the form of a projection or a recess. The tooth member 11 has side portions 14 parallel to the guide portions 12 and 13, and an arm portion 15 protruding in a slanting direction intersecting the guide portions 14.

A cam member 19 is a member for sliding the tooth member 11 between the guide portions 12 and 13. The cam member 19 is disposed between the base plate 1 and the tooth plate 3. The cam member 19 is rotatably received in the sectorial recess 6 of the tooth plate 3 and the recess 1b of the base plate 1 in such manner that the cam member 19 is rotatable on the center shaft 2 as its center. The cam member 19 has a cam surface 21 with a head portion 20, and this head portion 20 abuts on the arm portion 15 of the tooth member 11. The cam surface 21 slides on a cam surface 22 of the tooth member 11, and thereby causes the tooth member 11 to slide along the guide portions 12 and 13 for locking and unlocking between the internally toothed portion 7 and the externally toothed portion 10.

The center shaft 2 is inserted from the tooth plate 3 through the cam member 19, an operation lever 23 and the base plate 1. The center shaft 2 is engaged in a noncircular hole 24 of the base plate 1 so as to prevent relative rotation between the center shaft 2 and the base plate 1. The outer portion of the center shaft 2 is fixed to the base plate 1 by staking. In addition, a washer 2a is inserted from the outer side of the tooth plate 3, and the center shaft 2 is forced by staking, so that the tooth plate 3 is placed between the washer 2a and the cam member 19 in a manner to prevent the tooth plate 3 from being extracted from the center shaft 2. The outer end of the center shaft 2 hooks an inner end of a spiral spring 27, and the outer end of the spiral spring 27 is hooked to a pin 28 formed on the tooth plate 3 protruding toward the outside. By the spiral spring 27, the tooth plate 3 is always urged to rotate forward in a forward leaning direction.

The operation lever 23 is rotatably mounted on the center shaft 2, and connected with the cam member 19 so that the operation lever 23 and the cam member 19 rotate as a unit. A return spring 29 has one end engaged with the operation lever 23 and the other end engaged to a spring retainer 30 fixed to the base plate 1. In addition, the operation lever 23 is integrally formed with a foot-operated lever arm 23a. The inner device b, as shown in FIG. 3, has the same construction as the outer device a shown in FIG. 2, but the inner device b has a follower lever 23b, instead of the operation lever 23. The follower lever 23b is similar to the operation lever 23 but without a handle part. The follower lever 23b is rotatably supported on the center shaft 2 of the inner device b in the same manner as the operation lever 23 of the outer device a.

Figure 4:
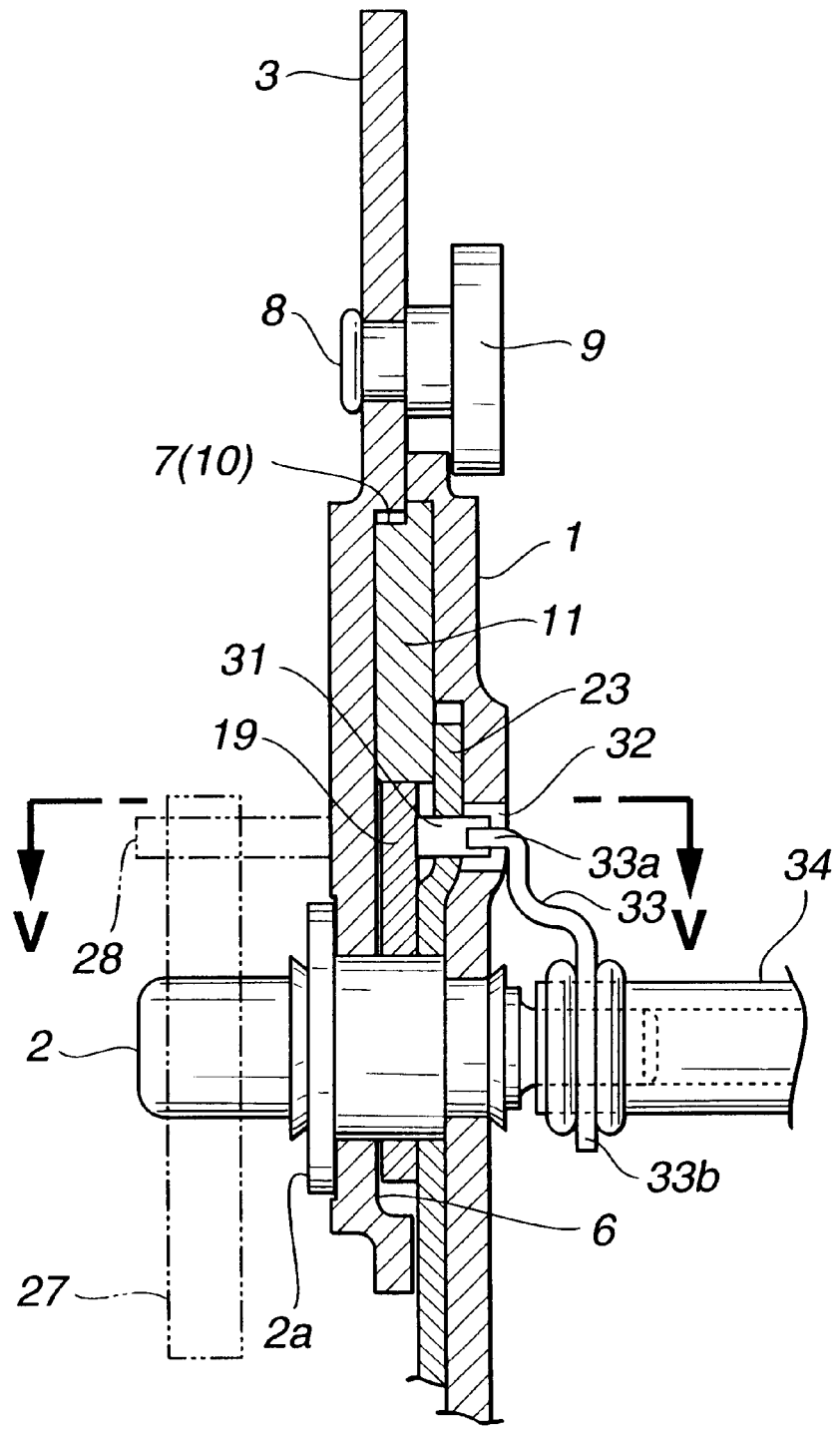
FIG. 4 is a longitudinal sectional view of a an arrangement of a pin 31, an elongate hole 32 and a link 33 in the seat reclining mechanism of FIG. 1.
Figure 5:
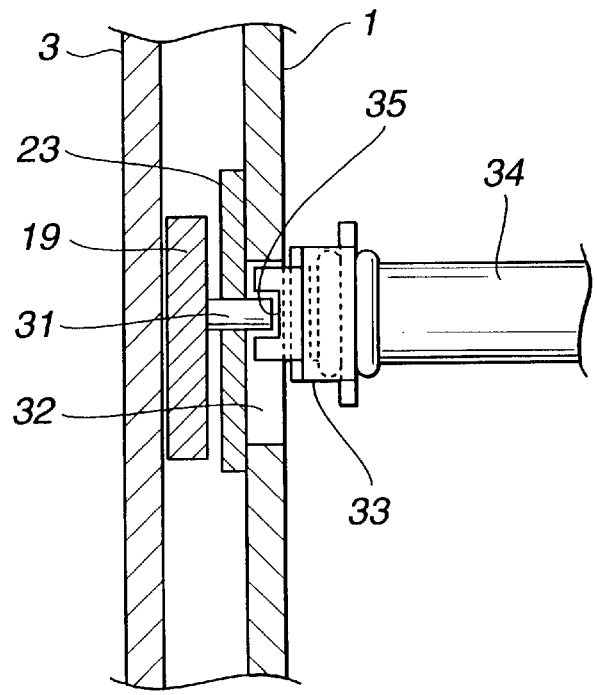
FIG. 5 is a sectional plan view taken across a line V—V in FIG. 4

A pin 31 is formed on the cam member 19 as a protrusion, and engages with an elongate circular arc hole or slot 32 formed in the base plate 1, in each of the outer and inner devices a and b. The elongate arc hole 32 of the base plate 1 extends in the form of an arc of a circle of a predetermined radius around the center shaft 2 as shown in FIG. 2 (or FIG. 3). The tip of the pin 31 is received in the elongate circular arc hole 32 without projecting inward beyond the inner side of the base plate 1. A link 33 for the left and right linkage of the dual lock seat reclining mechanism has a first end (or upper or outer end) portion 33a engaging with the pin 31 of the cam member 19, and a second end (or lower or inner end) portion 33b connected with one end of a connection member 34 for connection between the left and right devices a and b. The connection member 34 of this example is a connection pipe extending laterally between the outer and inner devices a and b, and having an outer pipe end supported by the center shaft 2 of the outer device a, and an inner pipe end supported by the center shaft 2 of the inner device b. The link 33 of the outer deice a is connected with the outer end of the connection pipe 34 while the link 33 of the inner device b is connected with the inner end of the connection pipe 34. On each of the outer and inner sides, the end of the connection pipe 34 is rotatably fit over the center shaft 2. In this way, the outer and inner devices a and b are connected for simultaneous operation therebetween. As shown in FIG. 4, the upper end of the link 33 is bent outward toward the base plate 1 and inserted in the elongate circular arc hole 32. As shown in FIG. 5, the upper end of the link 33 has a recess 35 engaging with the tip end of the pin 31 in the elongate arc hole 32.

In the example shown in FIG. 4, each link 33 has the outer portion 33a including a first segment inserted in the elongate arc hole 32, and a second segment extending alongside the base plate 1 and forming an angled bend of about 90° between the first and second segments.

As shown in FIG. 4, the swingable unit of the cam plate 19 and the operation lever 23, and the tooth member 11 are placed, along the axial direction of the connection pipe 34, between the base plate 1 on the inner side and the tooth plate 3 on the outer side. The pin 31 projects from the cam member 19 inward along the axial direction of the connection pipe 34.

Figure 6:
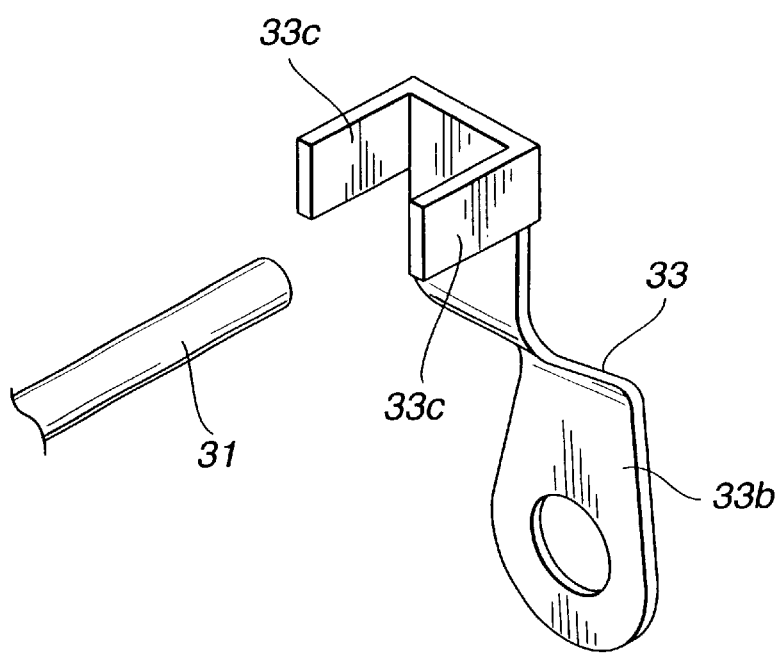
FIG. 6 is a perspective view showing another example of the engaged pair of the link and pin.

In the example shown in FIGS. 4 and 5, the link 33 is a strip plate bent as shown in FIG. 4 and has the recess 35 as shown in FIG. 5. FIG. 6 shows another example. The link 33 of FIG. 6 is formed by bending left and right arm portions 33c of a simple T-shaped sheet metal so as to form a recess for receiving the pin 31. The left and right arm portions 33c have flat abutment surfaces confronting each other across the tip end of the pin 31. Alternatively, the tip end of the pin 31 is formed so as to have a bifurcated or recessed portion forming a recess, similar to the recess 35, for receiving a tip end of the link 33.

Figure 7:
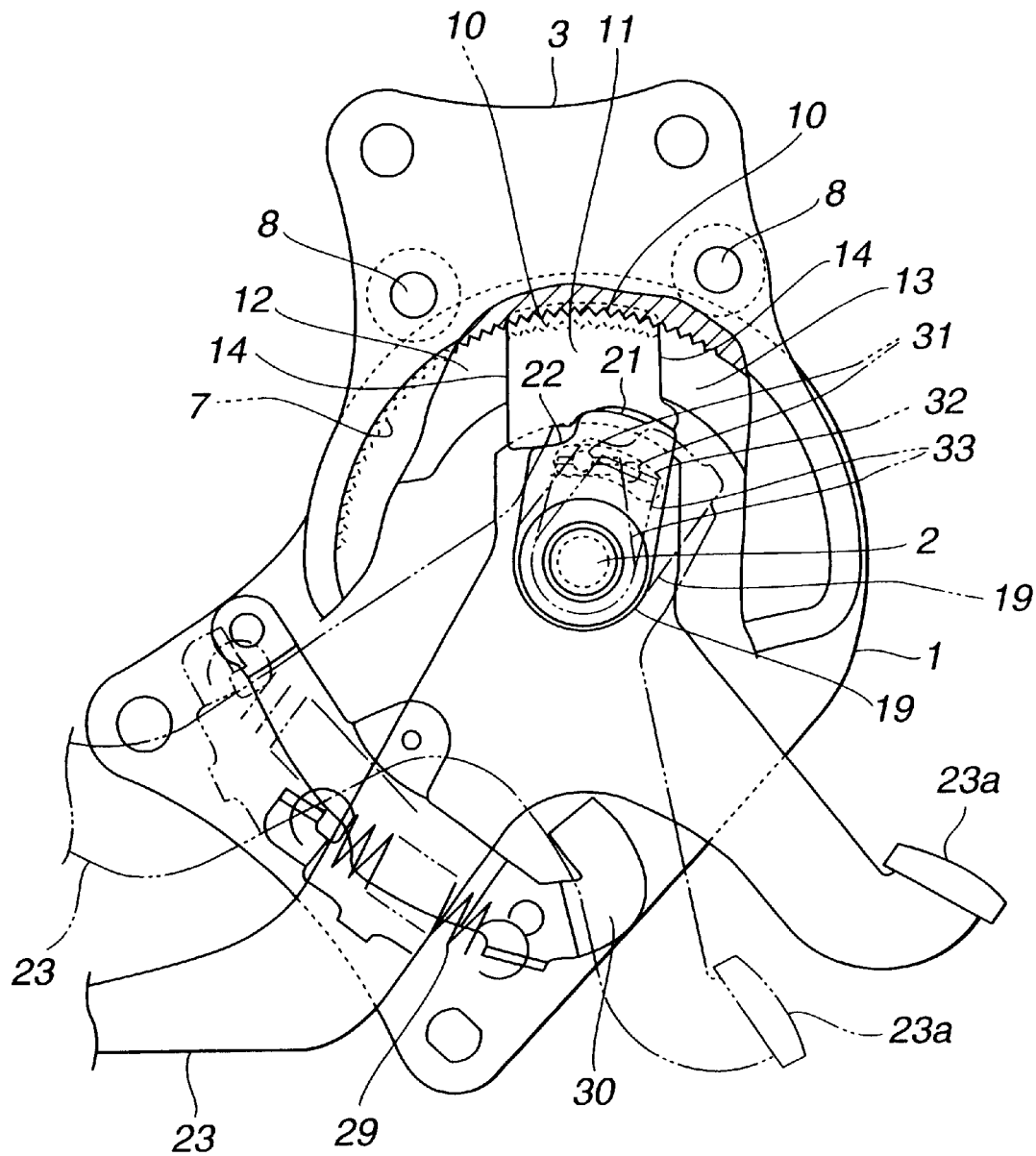
FIG. 7 is a view for illustrating operations of the seat reclining mechanism according to the embodiment of the present invention.

The thus-constructed internal gear type seat reclining mechanism is operated as follows: When, as shown in FIG. 7, the operation lever 23 is rotated clockwise on the center shaft 2 against the force of the return spring 29, the cam member 19 rotates clockwise together, and therefore the connection pipe 34 rotates around the center shaft 2 through the engaged pair of the pin 31 and the link 33. In the inner device b, the inner end of the connection pipe 34 rotates the cam member 19 clockwise through the engaged pair of the pin 31 and the link 33, so that the left and right devices a and b are operated together.

On each of the outer and inner sides, therefore, the head portion 20 of the cam member 19 comes off the underside of the tooth member 11, the cam surface 21 slides on the cam surface 22, and the tooth member 11 slides along the guide portions 12 and 13 radially inward toward the center shaft 2, so that the tooth portions 7 and 10 are disengaged from each other.

As a result, the tooth plate 3 rotates forward by the force of the spiral spring 27. When the seat back is pushed back to determine the angle of inclination, and the operation lever 23 is released, the operation lever 23 returns to the original position forced by the return spring 29, the cam member 19 rotates anticlockwise, and the head 20 of the cam member 19 abuts against the underside of the arm portion 15 of the tooth member 11. Thus, the tooth member 11 slides along the guide portions 12 and 13 radially outward away from the center shaft 2, and the tooth portions 10 and 7 are engaged again into the locked state.

As explained above, each link 33 has the bent or hooked upper end slidably received in the elongate circular arc hole 32 opened in the base plate 1, and engaged with the pin 31 fixed to the cam member 19. Therefore, the upper end of each link 33 is snugly concealed without being exposed between the left and right devices a and b. This arrangement can avoid interfere with the seat cushion, and trouble in the left and right interlocking mechanism In the example of FIG. 6, moreover, each link 33 has the side arm portions 33c having the relatively broad confronting surfaces for abutting on the pin 31. The design of FIG. 6 can ensure the engagement between the pin 31 and the link 33 irrespective of nonuniformity in the pin position due to dimensional errors, and improve the rigidity.

What is claimed is:

1. A dual lock seat reclining mechanism comprising:
   a rotatable connection member extending from a left end to a right end;
   a left mechanism connected with the left end of the connection member and a right mechanism connected with the right end of the connection member, each of the left and right mechanisms comprising:
   a base plate adapted to be fixed to a seat cushion, the base plate comprising an elongate arc hole;
   a swing tooth plate adapted to be secured to a seat back, the tooth plate having a recess formed with an internally toothed portion;
   a center shaft supporting the tooth plate rotatably relative to the base plate;
   a lock tooth member having an externally toothed portion for engaging with the internally toothed portion of the swing tooth plate;
   an operation member for moving the lock tooth member along the base plate toward and away from the internally toothed portion of the swing tooth plate for engagement and disengagement between the externally toothed portion and the internally toothed portion, the operation member comprising a pin; and
   a link comprising an inner portion connected with the connection member, and an outer bent portion received in the elongate arc hole of the base plate and engaged with the pin.

2. The dual lock seat reclining mechanism as claimed in claim 1, wherein the base plate comprises a guide portion and the lock tooth member is received slidably in the guide portion of the base plate.

3. The dual lock seat reclining mechanism as claimed in claim 2 wherein the operation member comprises an operating lever rotatably mounted on the center shaft, and a cam member for moving the toothed member in response to a rotational motion of the operating lever.

4. The dual lock seat reclining mechanism as claimed in claim 3, wherein the operation member is placed between the base plate and the swing tooth plate, and the pin of the operation member has an engaging end which is received in the elongate arc hole and engaged with the outer bent portion of the link in the elongate arc hole.

5. The dual lock seat reclining mechanism as claimed in claim 4, wherein the lock tooth member is disposed between the base plate and the swing tooth plate, and the guide portion of the base plate comprises first and second guide walls for allowing the lock tooth plate to slide in an inward direction toward the center shaft and an outward direction away from the center shaft.

6. The dual lock seat reclining mechanism as claimed in claim 5, wherein the left and right ends of the connection member are rotatably supported, respectively, by the center shafts of the left and right mechanism, wherein the base plates of the left and right mechanism are placed between the swing tooth plates of the left and right mechanisms, and wherein, in each of the left and right mechanisms, the link comprises an outer portion extending along an axial direction of the connection member into the elongate arc hole of the base plate, and a radially extending inner portion.

7. The dual lock seat reclining mechanism as claimed in claim 6, wherein each link is in the form of a shaped plate, and the inner portion of each link is mounted on the connection member so as to transmit rotation between the left and right mechanisms.

8. The dual lock seat reclining mechanism as claimed in claim 6, wherein each link is in the form of a shaped plate, the outer portion of each link comprises first and second arms confronting each other across the pin.

9. The dual lock seat reclining mechanism as claimed in claim 6, wherein, in each of the left and right mechanisms, the outer portion of the link comprises a first segment for engaging with the tip end of the pin, and a second segment extending along the base plate toward the inner portion of the link, and forming an angled bend between the first and second segments of the outer portion, and the inner portion of the link comprises a first segment connected with the connection member and a second segment extending to the second segment of the outer portion and forming a bend between the first and second segments of the inner portion of the link.

* * * * *